United States Patent
Poston et al.

(10) Patent No.: US 8,010,507 B2
(45) Date of Patent: Aug. 30, 2011

(54) METHOD AND SYSTEM FOR HARMONIZATION OF VARIANTS OF A SEQUENTIAL FILE

(75) Inventors: Timothy Poston, Bangalore (IN); Tomer Shalit, Holmsund (SE); Mark Dixon, Skärholmen (SE); Anna Westerberg, Umeå (SE); Oskar Fjellström, Umeå (SE)

(73) Assignee: PADO Metaware AB, Holmsund (SE)

( * ) Notice: Subject to any disclaimer, the term of this patent is extended or adjusted under 35 U.S.C. 154(b) by 607 days.

(21) Appl. No.: 12/123,537

(22) Filed: May 20, 2008

(65) Prior Publication Data

US 2008/0313243 A1    Dec. 18, 2008

Related U.S. Application Data

(60) Provisional application No. 60/939,865, filed on May 24, 2007.

(51) Int. Cl.
*G06F 17/00* (2006.01)

(52) U.S. Cl. ........ 707/687; 707/695; 707/821; 707/829; 715/210; 715/229

(58) Field of Classification Search .................. 707/687, 707/695, 821, 829; 715/210, 229
See application file for complete search history.

(56) References Cited

U.S. PATENT DOCUMENTS

| | | | |
|---|---|---|---|
| 5,758,347 A | 5/1998 | Lo et al. | |
| 5,862,346 A | 1/1999 | Kley et al. | |
| 5,893,908 A | 4/1999 | Cullen et al. | |
| 5,983,241 A * | 11/1999 | Hoshino | 1/1 |
| 6,088,694 A * | 7/2000 | Burns et al. | 1/1 |
| 6,216,175 B1 * | 4/2001 | Sliger et al. | 717/169 |
| 6,513,050 B1 * | 1/2003 | Williams et al. | 1/1 |
| 7,533,133 B1 * | 5/2009 | Lanzatella et al. | 1/1 |
| 2002/0010702 A1 * | 1/2002 | Ajtai et al. | 707/101 |
| 2002/0019827 A1 | 2/2002 | Shiman et al. | |
| 2002/0169740 A1 * | 11/2002 | Korn | 707/1 |
| 2002/0198703 A1 * | 12/2002 | Lydecker et al. | 704/200.1 |
| 2003/0066028 A1 * | 4/2003 | Payne et al. | 715/500 |
| 2003/0163801 A1 * | 8/2003 | Thames et al. | 717/123 |
| 2004/0186817 A1 * | 9/2004 | Thames et al. | 707/1 |
| 2004/0189713 A1 * | 9/2004 | Thames et al. | 345/810 |
| 2004/0199516 A1 * | 10/2004 | Thames et al. | 707/100 |
| 2004/0205653 A1 | 10/2004 | Hadfield et al. | |
| 2005/0027757 A1 * | 2/2005 | Kiessig et al. | 707/204 |
| 2005/0169303 A1 * | 8/2005 | Toma et al. | 370/466 |
| 2006/0259949 A1 * | 11/2006 | Schaefer et al. | 726/1 |
| 2007/0033376 A1 * | 2/2007 | Sinclair et al. | 711/203 |

(Continued)

OTHER PUBLICATIONS

U.S. Appl. No. 12/292,640, filed Nov. 21, 2008; Inventor: Poston et al.
U.S. Appl. No. 12/366,418, filed Feb. 25, 2009; Inventor: Poston et al.
U.S. Appl. No. 11/971,220, filed Jan. 9, 2008; Inventor: Poston et al.
U.S. Appl. No. 11/954,450, filed Dec. 12, 2007; Inventor: Poston et al.

(Continued)

*Primary Examiner* — Don Wong
*Assistant Examiner* — Hanh B Thai
(74) *Attorney, Agent, or Firm* — Nixon & Vanderhye P.C.

(57) ABSTRACT

A set of versions of a file, with one chosen as baseline version, is displayed as a single flow of material where all agree with the baseline and in separate difference columns where they do not. A current version may be edited either directly or by adoption of material from different versions, which may be toggled in and out of visibility. Sequential undo (step-wise or by a slider) can be localized to chosen subsets of the current version, and any chosen subset can be restored as a unit to an earlier state.

19 Claims, 10 Drawing Sheets

U.S. PATENT DOCUMENTS

| | | | |
|---|---|---|---|
| 2007/0055916 A1* | 3/2007 | Prang et al. | 714/47 |
| 2007/0106707 A1* | 5/2007 | Yamato | 707/202 |
| 2007/0186032 A1* | 8/2007 | Sinclair et al. | 711/103 |
| 2008/0028300 A1 | 1/2008 | Krieger et al. | |
| 2009/0089535 A1* | 4/2009 | Lohmar et al. | 711/173 |
| 2010/0023525 A1* | 1/2010 | Westerlund et al. | 707/10 |

OTHER PUBLICATIONS

Office Action mailed Mar. 4, 2010 in co-pending U.S. Appl. No. 11/971,220.

Office Action mailed Nov. 11, 2010 in co-pending U.S. Appl. No. 11/971,220.

Office Action mailed Dec. 7, 2010 in co-pending U.S. Appl. No. 12/123,537.

S. Needleman et al., *A general method applicable to the search for similarities in the amino acid sequence of two proteins*, J Molec. Biol. 48(3): 443-53 (1970 ).

T F Smith et al., *Identification of Common Molecular Subsequences*, J. Molec. Biol., 147:195-197 (1981).

A. Wozniak, *Using video-oriented instructions to speed up sequence comparison*, Comput. Appl. Biosci. 13(2):145-50, 1997.

S. Kurtz, et al., *Versatile and open software for comparing large genomes*, Genome Biology (Jan. 30, 2004), Genome Biol., R12.1-R12.9.

A. L. Delcher, et al., *Fast Algorithms for Large-scale Genome Alignment and Comparison*, Nucleic Acids Research 30, 11 2478-2483(2002).

A. L. Delcher, et al., *Alignment of Whole Genomes*, Nucleic Acids Research, 27:11 (1999), 2369-2376.

Metzler et al., "Similarity Measures for Tracking Information Flow," ACM, 2005.

Goan et al., "Identifying Information Provenance in Support of Intelligence Analysis, and Protection," Springer-Verlag, 2006.

\* cited by examiner

As the Western population ages in the coming decades, the human and economic impacts of cardiovascular disease (CVD) are expected to increase. Surgery due to CVD will grow, and methods for safer procedures are vital.

Problem
During and after heart surgery, an already strained heart is under severe stress. The surgeon needs to carefully weigh medication to strengthen heart action against straining the heart so much that it will stop altogether. To make the best decision a surgeon needs tools for close monitoring of the heart.

The monitoring tools in widespread use today use ultrasound and pressure measurements, but volume measurements from ultrasound are discontinuous and costly. The Pressure-Volume (PV) diagram is a powerful tool for visualizing Left Ventricle (LV) performance, but to be useful in the OR it must be available continuously and on-line. Current state-of-the-art measurements do not meet the requirements of time resolution, endurance and accessibility in assessing cardiac function. The best method ion the market today is a catheter.

For a century it has been known that the cardiac state is clearly shown by the pressure/volume relationship of the ventricles whilst the heart is under workload. No suitable equipment has been made for monitoring this.

Fig. 2a

As the Western population ages in the coming decades, the human and economic impacts of cardiovascular disease (CVD) are expected to increase. Surgery due to CVD will grow, and methods for safer procedures are vital.

For a century it has been known that the cardiac state is clearly shown by the pressure/volume relationship of the ventricles whilst the heart is under workload. No suitable equipment has been made for monitoring this.

Problem
During and after heart surgery, an already strained heart is under severe stress. The surgeon needs to carefully weigh medication to strengthen heart action against straining the heart so much that it will stop altogether. To make the best decision a surgeon needs tools for close monitoring of the heart.

The monitoring tools in widespread use today use ultrasound and pressure measurements, but volume measurements from ultrasound are discontinuous and costly. The Pressure-Volume (PV) diagram is a powerful tool for visualizing Left Ventricle (LV) performance, but to be useful in the OR it must be available continuously and on-line. Current state-of-the-art measurements do not meet the requirements of time resolution, endurance and accessibility in assessing cardiac function. The best method ion the market today is a catheter.

Fig. 2b

As the Western population ages in the coming decades, the human and economic impacts of cardiovascular disease (CVD) are expected to increase. Surgery due to CVD will grow, and methods for safer procedures are vital.

Problem
During and after heart surgery, an already strained heart is under severe stress. The surgeon needs to carefully weigh medication to strengthen heart action against straining the heart so much that it will stop altogether. To make the best decision a surgeon needs tools for close monitoring of the heart.

The monitoring tools in widespread use today use ultrasound and pressure measurements, but volume measurements from ultrasound are discontinuous and costly. The Pressure-Volume (PV) diagram is a powerful tool for visualizing Left Ventricle (LV) performance, but to be useful in the OR it must be available continuously and on-line. Current state-of-the-art measurements do not meet the requirements of time resolution, endurance and accessibility in assessing cardiac function. The best method ion the market today is a catheter.

We have known for a century it has been known that the cardiac state is clearly shown by the pressure/volume relationship of the ventricles whilst the heart is under workload. No suitable equipment has been made for monitoring this.

Fig. 2c

METHOD AND SYSTEM FOR HARMONIZATION OF VARIANTS OF A SEQUENTIAL FILE

BACKGROUND OF THE INVENTION

If several authors have simultaneously produced modified versions of a common document, it can be a painful process to produce a version which incorporates (or intentionally omits) their changes, and—for passages changed by more than one author—synthesizes the proposed changes into a single, readable passage containing their different insights.

Various software attempts to ease this difficulty. For example, Microsoft Word has a 'compare and merge documents' tool. Suppose a document contains the sentence "The best method on the market today is a catheter," amended by one author to "The best method on the market today is a catheter, which sucks" (sucking is indeed among the functions that catheters perform) while another gives "The best method on the market today is a catheter, which does not directly assess volume". Then, merging the first with the original and then merging the second yields "The best method on the market today is a catheter, which sucks does not directly assess volume". (No markers indicate where there were pre-merger conflicts, or the sources of the different versions.) This example does not exhaust, but does illustrate, the harmonization tools available to users. A more usable and structured approach is sorely needed.

A more acute version of the harmonization problem arises where the 'text' is a computer program, with different members working on different modules. Minor inconsistencies among assumptions applied to different sections can easily crash the entire application, or even prevent it from compiling. This has led to an industry of 'version control' software such as (sampling those running under Windows) Visual SourceSafe, ClearCase, abCVS, CWPerforce and Alienbrain. Some programmers can fit themselves into the discipline of using one of these, since they appreciate the logic and learn its elaborate procedures for detailed control. Many more programmers fail the discipline, or resist it. Few non-programmers can even understand the rules.

In "A Method and System for Facilitating the Production of Documents" submitted to USPTO in January 2007 60/884230, the present inventors described a means to compare a set of documents to describe descent among documents, which among other benefits makes clear which versions have already been incorporated, and need not be looked at again. Within this setting, they disclosed an exemplary means of combining changes from among those documents that still need attention. This means presents the user with 'slips' across the width of the text, as in Drawing 1, corresponding to Drawing 16 of that application. In the example shown, the buttons 111 and 113 for version authors Marion and Anne have been activated, and hence overlap the text window 101. Since the button 112 for George has not been pressed, it remains disjoint from the window 101, and that user's changes do not appear as slips. The changes represented by the versions from Marion and Anne do appear: colour coding (not shown in this medium) and the tab handle 121 show that it is Anne who has proposed 1635 the deletion of the word "monitoring" and the transfer 131 of the whole sentence that contains it to a different location: Marion's slip (with the tab handle 123) proposes a tightening in situ. The application goes on to describe means by which the user can accept, reject, modify and combine such proposed changes.

The present application discloses a different, column-structured embodiment of the above invention, and applies it also to situations where the descent description there disclosed is unavailable, or not in use. For example, suppose the user Noah has drafted a naval architecture proposal and sent it to Ham, Shem and Japheth for suggestions. Each of them revises it, according to his particular preoccupations and expertise, and return a version to Noah. (If he also circulates it to the others, the resulting proliferation of texts may make descent handling important. We suppose here that only Noah receives the new versions.) They may use Change Tracking software which displays to Noah, in each version, what changes have been made. If the file had gone from Noah to Ham to Shem to Japheth in sequence, and then returned to Noah, he would receive a single file, perhaps with changes colour-coded by author. But Noah had a deadline, and asked them to work in parallel, so he must now harmonize three distinct files.

The technology described in this application concerns the means by which a user may do such harmonization, for any group of sequential files. By this we mean not that the file's 0s and 1s are sequentially stored in the computer's memory (this applies piecewise to all files, by the fundamental digital architecture involved), but that the file or its sections are normally read sequentially by the user: text, musical notation and computer code are all examples of this, though the reader's attention may skip from subsequence to subsequence (paragraph, movement, header code, etc.) in any order. Images and 3D scans, or other 3D constructs, are not sequential files in this sense. Music and video files are sequential, but the technology described in this application applies to them only where they are presented to the user as a modifiable sequence of sequentially organised lines: visually, or for the vision-impaired, by tactile means such as Braille. The means known to us for audible rendering do not lend themselves to its use.

Summary

Assume chosen a 'baseline' sequential file (illustrated by the short document 210 in Drawing 2) and a set S of related sequential files such as 220 and 230, we create a single data structure describing the baseline file F, and the differences between F and each other file f in the set S, using a tree representation of the files and their differences, a flat file representation, or otherwise. We display it to the user as shown in Drawing 3.

Where material is identical between the various versions, the viewing window 300 shows material in blocks such as 301, 302 and 303 that use the full width available. A segment for which alternatives have been proposed appears in a column with one or more of those versions parallel to it, colour coded (not shown in this medium) by origin. Where one change includes translocation of a passage, at the new location our preferred embodiment shows both the explicitly moved material, and (in our preferred embodiment) any in situ modifications of that passage proposed in other versions. Small, isolated changes are displayed in line, without separate columns. Handle brackets 340 in the margin (whether associated with small, in-line change displays or larger, columnized changes) can be toggled 'open' as in Drawing 3 or 'closed' as in Drawing 4, with the local modification displayed or hidden accordingly. Where space is a problem, columns may be minimized or their combined width may be permitted to expand into a laterally scrollable space wider than the text window. In our currently preferred embodiment, the user can drag columns sideways or otherwise permute their lateral order, and iconize them as fully dealt with. Changes made by the current user create a new 'current version', which is displayed in line or by columns following the same rules, but in our preferred embodiment to the left of the baseline material (which should be visibly continuous), rather than to the right of it. In the case of a pure insertion, either proposed by a non-baseline version or by the current user, the baseline appears as a blank column (optionally, narrower than other columns). Where a version proposes no changes from the baseline, it does not have a column, even if other versions do.

The user may adopt a proposed change by (according to the embodiment) clicking or double-clicking it, dragging it to the 'current version' position, cutting and pasting a part of it into the current version column, or by a multiplicity other such means, that will be evident to one skilled in the art.

Reversal ('Undo') of the change represented by a single columnar segment can be accomplished by the standard adoption mechanisms described above, using a baseline or old-baseline column as source. Alternatively, if a segment of the current version is currently selected, then an Undo keypress such as the widely-used Control-Z will reverse changes made in that segment only, with a 're-do' key-press such as Control-Y undoing the reversals. In the same context of the selection of some or all of the current version, a slider widget may be used to the same effect, with leftward motion giving the same result as a sequence of Control-Z presses, and rightward motion equivalent to a sequence of Control-Ys.

BRIEF DESCRIPTION OF THE DRAWINGS

Drawing 1: A harmonization interface using horizontal difference slips.

Drawing 2: A sequential baseline file and a set of related sequential files.

Figure 1:
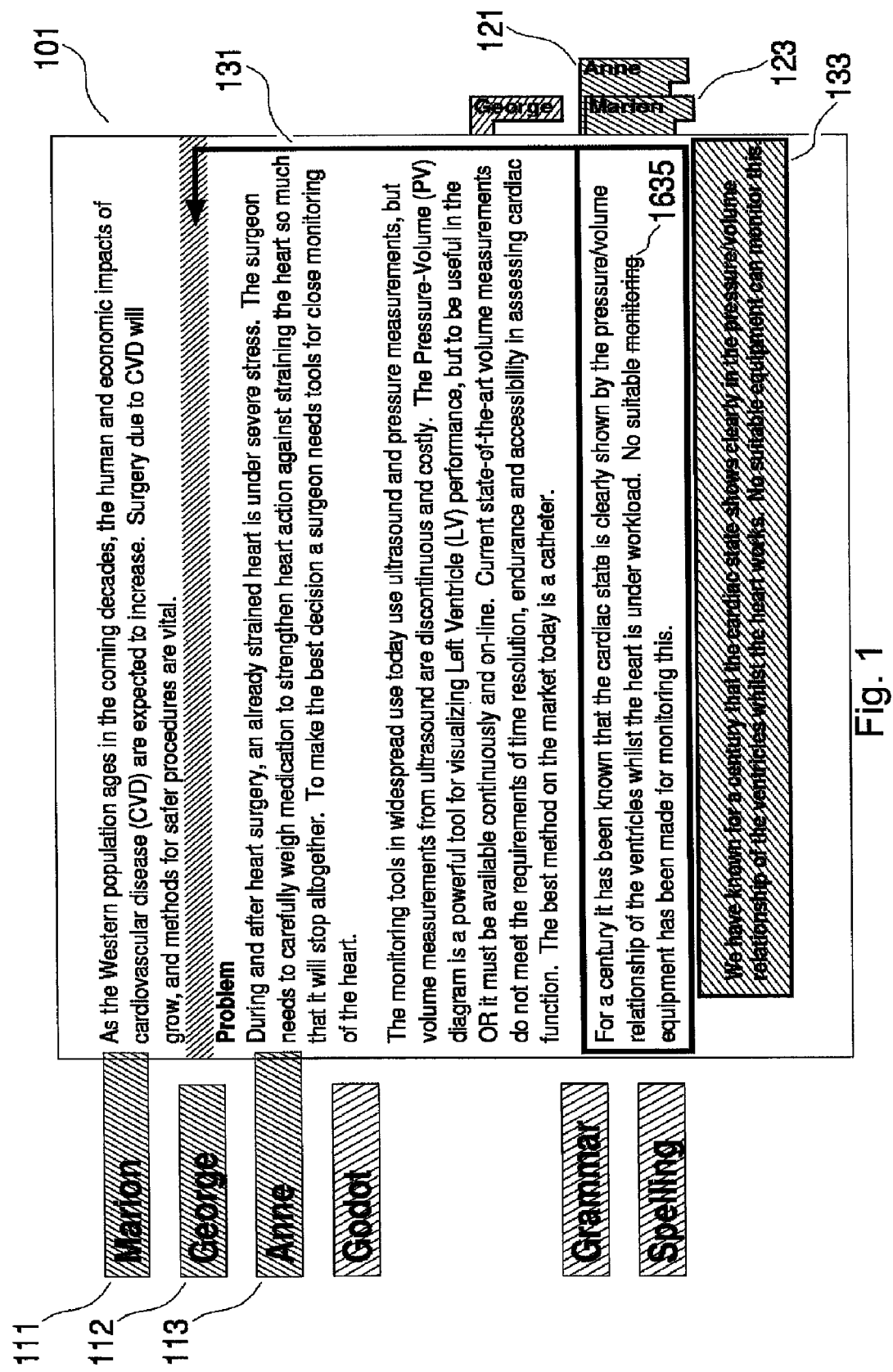
Figure 3:
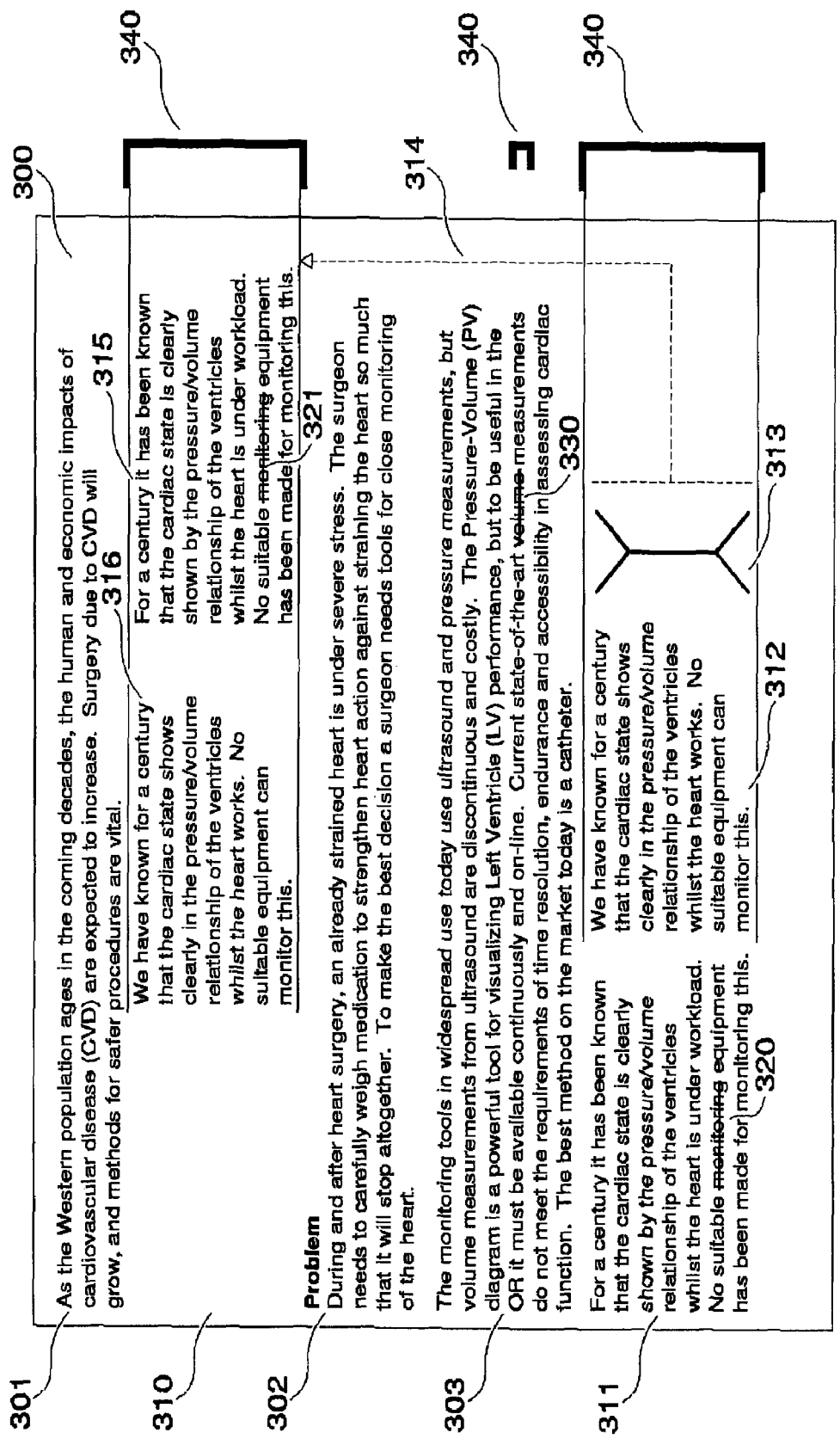
Figure 4:
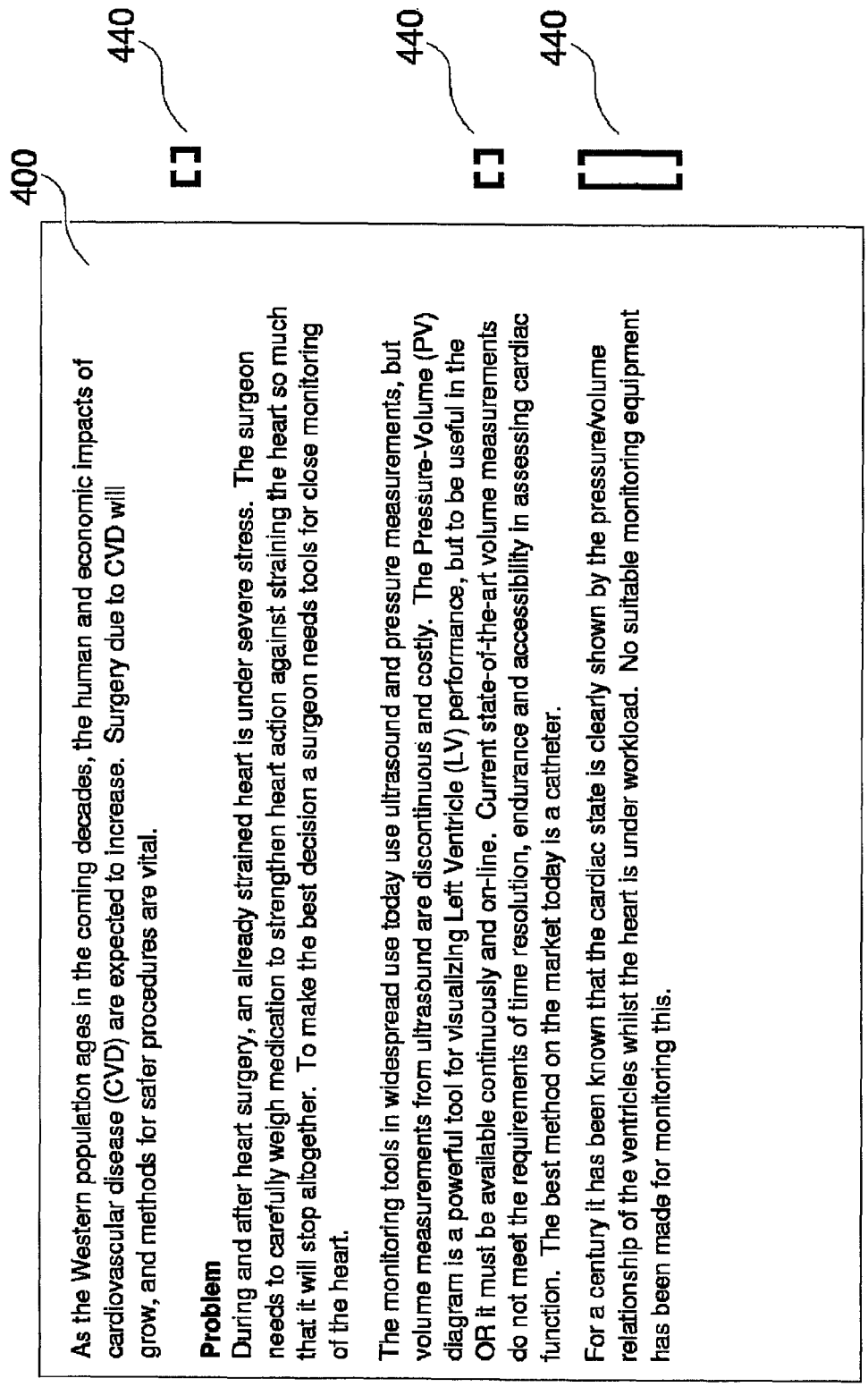
Figure 5:
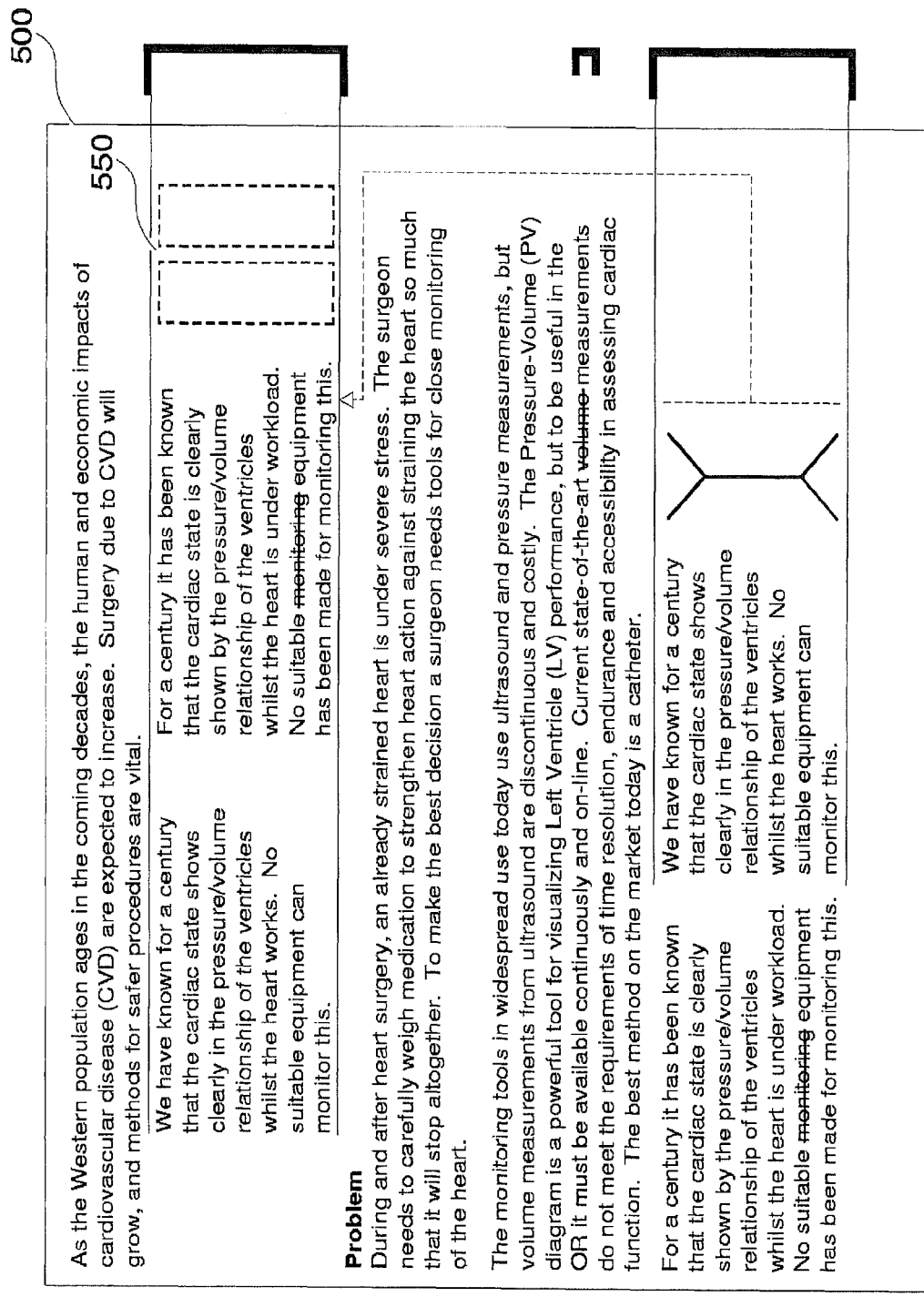
Figure 6:
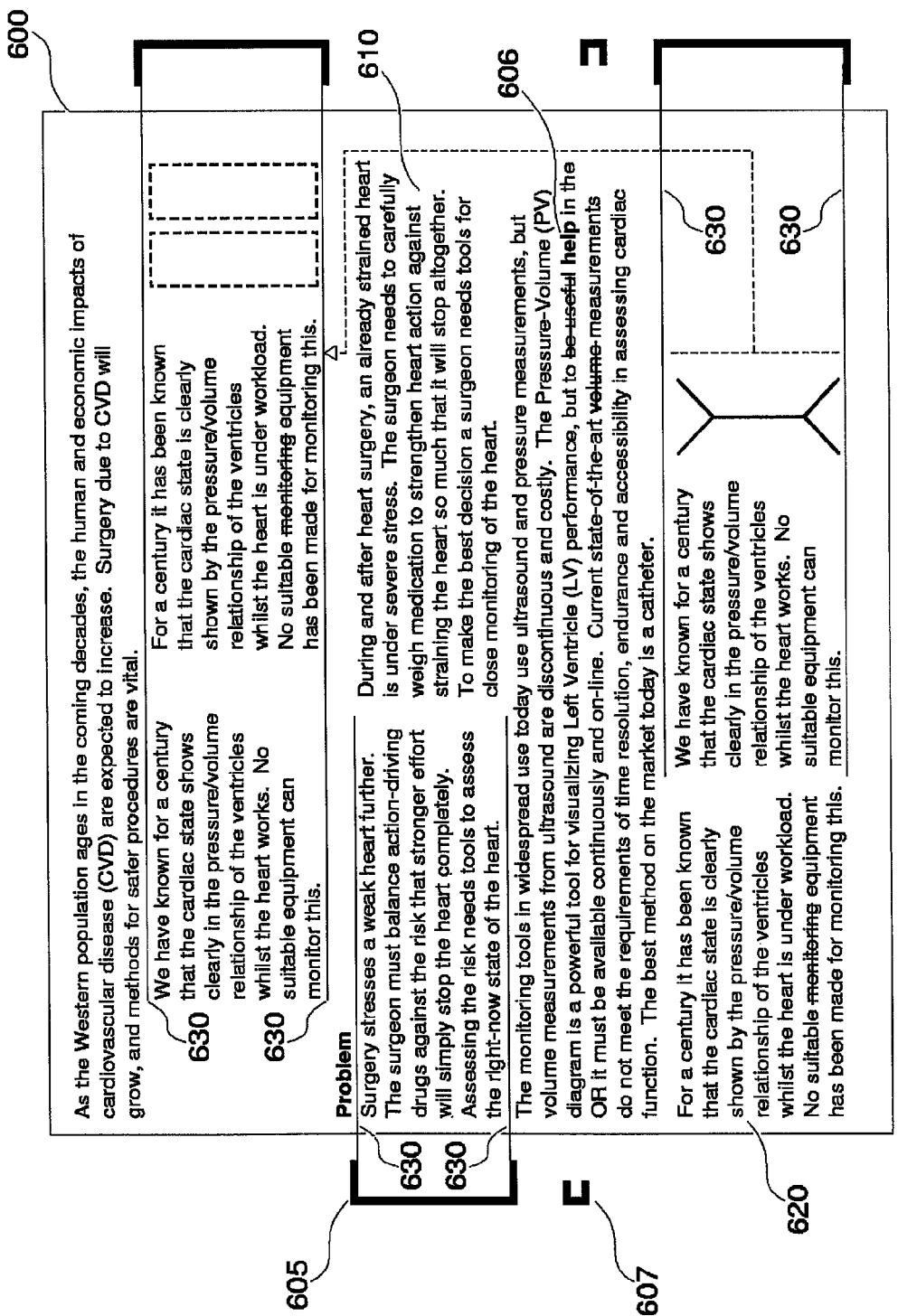
Figure 7:
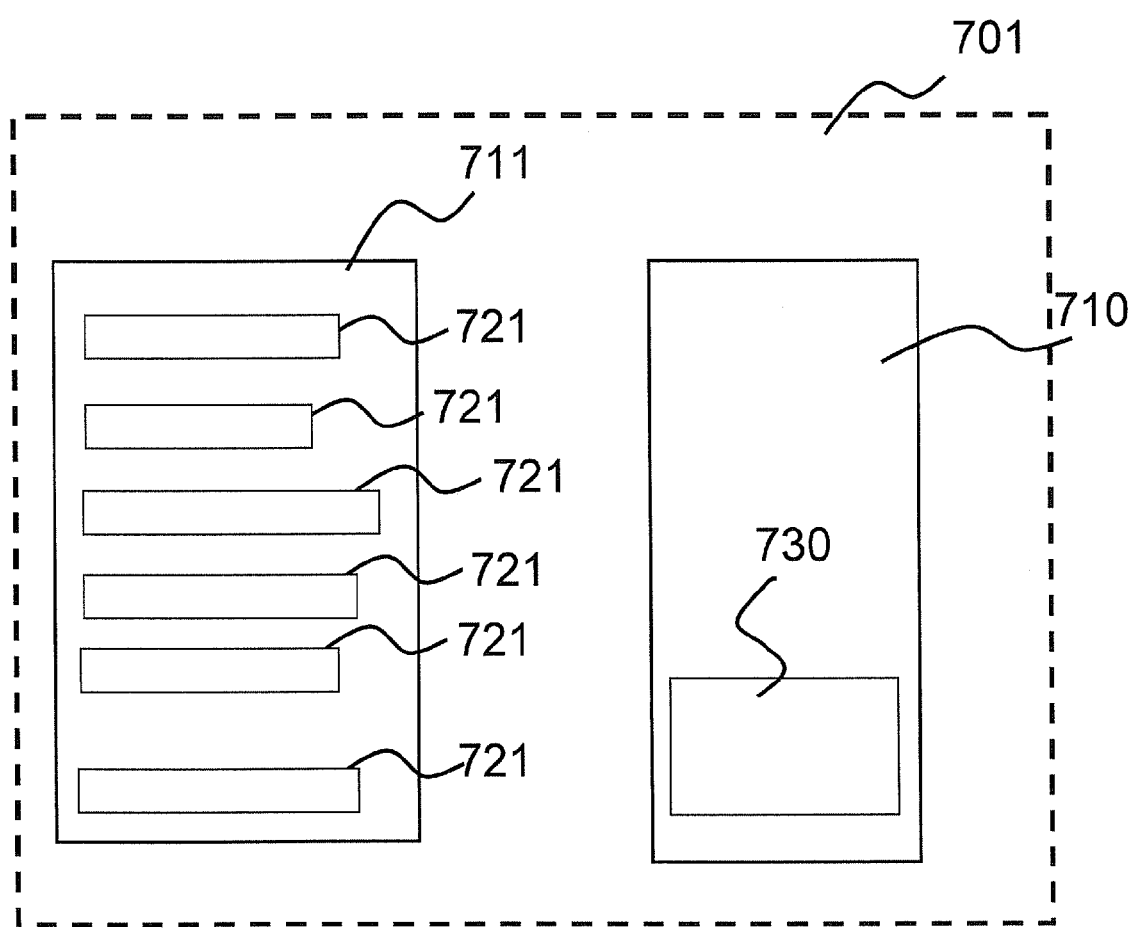
Figure 8:
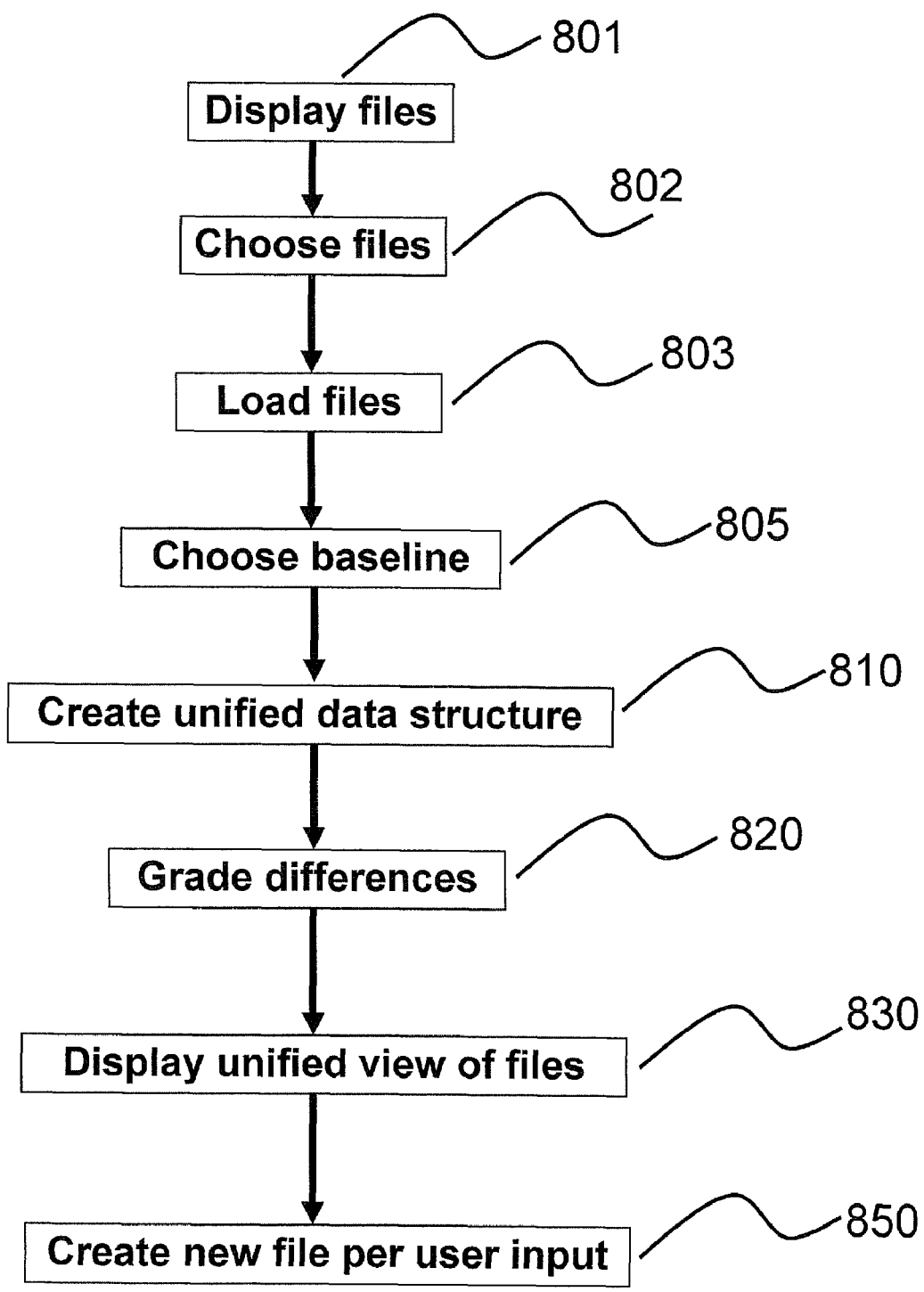

Drawing 3: A display using in-line markup for small differences from a baseline, columns for large ones.

Drawing 4: A display with all elements' difference markup toggled closed.

Drawing 5: A display with some columns iconized.

Drawing 6: A display with current version data on the side opposite to other departures from a baseline.

Drawing 7: A system appropriate to implement the technology.

Drawing 8: A flowchart of example steps.

DETAILED DESCRIPTION OF EXAMPLE EMBODIMENTS

The technology described in this application should not be construed as limited to the embodiments set forth herein. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The technology described in this application may be embodied as methods, electronic devices, and/or computer program products. Accordingly, it may be embodied in hardware and/or in a software (including firmware, resident software, micro-code, etc.) controlled computer, which may be generally referred to herein as a "circuit" or "module". Furthermore, the technology described in this application may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions executed by a controller. These program instructions may be provided to a controller, which may include one or more general purpose processors, special purpose processors, ASICs, and/or other programmable data processing apparatus, such that the instructions, which execute via the controller and/or other programmable data processing apparatus, implement the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out disclosed operations may be written in an object oriented programming language such as Java®, Smalltalk or C++. However, the computer program code for carrying out operations may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

Suppose chosen a 'baseline' sequential file and a set S of related sequential files which we will refer to as 'derived' files, though without prejudice to the possibility that S may include an earlier file, containing perhaps material deleted in creating the current base line version but which the user wishes to resurrect. The input here may in fact be any set S of sequential files, though the technology described in this application is most useful where they have considerable content in common, as in the small example files 210, 220 and 230 in Drawing 2. The choice of one of the files as the baseline 210 may be by a default allocation, such as the first file to be input, or as that file which minimizes some measure of total difference between that file and the others. (For instance, "the quick brown fox" is nearer to both "the slow brown wolf" and "a quick red fox" than these are to each other, giving it a smaller differences total.) In our preferred embodiment, however, the choice of baseline is either explicit by the user, or a version from which others are known to descend. The three exemplary versions in Drawing 2, of a small file, illustrate that it is not easy to scan displays visually for differences. If the versions 220 and 230 had been created from the version 210 with standard change-tracking software active, the differences of each from 210 would be easily seen: but comparing the changes themselves, between versions, is cumbersome (and quickly becomes more so with larger or more numerous files). There is a slight change, deletion of the word "monitoring", in the moved paragraph 221 from its unmoved original 211, which is not displayed by any software that treats the whole of 221 as simply as an insertion. Noticing this, and choosing between it and the larger change in the un-moved version 231, is particularly hard if the two locations are widely separated.

We create a single data structure describing the baseline file F, and the differences between F and each other file f in the set S. (We do not, in our preferred embodiment, create an explicit representation of the differences between every pair of two non-baseline files in the set S.) Our preferred embodiment uses a tree representation of F, where the 'root' of the tree (referring to the whole file) has nodes logically attached to it which represent parts at the next level of subdivision (chapters or sections in a book, movements in a symphony, class definitions in some kinds of code, etc.), these have nodes representing subsections, passages, code blocks, etc., down to the level of the individual word, bar or other chosen basic unit. (We prefer not to extend this representation down to individual letters or notes.) These 'leaves' have integer identifiers which recur in separate occurrences of the same word: higher nodes have unique identifiers. We code the differences of f from F in a 'difference tree' where a changed section is denoted by a node, a changed subsection of this section is denoted by a child of that node, a changed paragraph directly contained within the subsection is denoted by a child of the subsection's node, and so on. Many hierarchical alternatives to this schema will be evident to one skilled in the art.

An embodiment could alternatively make use of non-hierarchical data structures, such as a sequence of words with included markers like the HTML <p>and </p>for the start and end of a paragraph, and a markup of changes like the 'bracket notation' widely used in the United Nations. By analogy with the HTML method one can mark the beginning and ending of an insertion by user Sheila as <inserted author="sheila">and </inserted>, and similarly for other changes. (Here the closing tag should relate individually to the opening one, so that <deleted author="sheila">text <deleted author="dilip">moretext <deleted author="dilip">othertext </deleted author="sheila">where Dilip's deletion is inside Sheila's, can be distinguished from <deleted author="sheila">text <deleted author="dilip">moretext </deleted author="sheila">othertext <deleted author="dilip">, where the deletions overlap.) This 'flat file' approach is not a preferred embodiment, as code for the interface described below would run more slowly with it than code exploiting a preprocessing step that builds a tree structure, but it is a possible embodiment.

Having constructed a unified representation of the baseline and other files, we display it to the user as shown in Drawing 3. This is somewhat stylised for clear reproduction within the present document, showing a smaller set of words in larger letters, and without colour coding, but illustrates the spatial layout and interaction.

We show first the fullest display. Where material is identical between the various versions, the viewing window 300 shows text in blocks such as 301, 302 and 303 that use the full width available. (This width may vary, with resizing of the window by the user or other factors.) A segment like 311, for which alternatives have been proposed in other versions, appears in a column with one or more of those versions parallel to it. In the case shown, one version proposes a deletion 313, move 314 and re-insertion 315 of the material 311. The same version proposes within the material 311 the deletion 320 of a redundant word, which is reproduced 321 in the re-inserted view 315. Parallel to the insertion 315 is the blank column 310, showing that the baseline document had no material between the segments 301 and 302. A shared color for the deletion markers 313, 320 and 321, or their backgrounds, associates them with the particular version in question, or with its author. (A color key is preferred to be included in the frame of the view, or easily summoned by a suitable click or clicks: many designs for this cue will be evident to one skilled in the art.)

If the deletion 313 were absent, the alternative version 312 of the text proposed in another version (and marked by a different color) would appear only in that location. But since it represents an alternative to the moved text 321, since it relates to the same text 311 that is deleted 313 and reinserted 315, it is also shown 316 parallel to the column 315. The user is thus able to click on either the column 315 or the column 316 to accept respectively the move 314 alone, or the rewrite 312 combined with that move. Since the small change 320 reappears 321, the user can separately accept or reject it.

Where a change such as the deletion 330 (or a similarly small substitution or transposition of words, not shown) is small enough to show in a readable manner within a single line, our preferred embodiment does so—preferably colour-coding or otherwise marking the source of the change—rather than creating parallel columns. Above a threshold density of such small changes, however, the display changes to multi-column.

Any handle bracket 340 in the margin may individually be toggled 'closed', giving the form 440 (as in Drawing 4) which may be inside or outside the text window 400: 'toggled' means that a second click reverses the effect. In our preferred embodiment a collective button (not shown) can open or close them all. The closed form thus shows the user that a suggested change exists in a particular derived file, and makes it easily available.

In some cases, more derived files include changes to the baseline file than can conveniently be arranged in clear columns. In Drawing 5, two columns 550 (appropriately colour coded in a manner evident to one skilled in the art: not shown in this mdium) are tokenized as narrow strips. The user can toggle columns into or out of this state, accepting where necessary the resulting extension beyond the normal text window 500. (If the resulting width goes beyond the surrounding display window, a sideways scroll bar for that window—or other sideways scrolling control, such as are well known to those skilled in the art—becomes active.) In our currently preferred embodiment, the user can drag columns sideways or otherwise permute their lateral order. Viewing modifications such as reducing the displayed dimensions of a minimized column, the use of a less saturated color, or moving it outside the text window 500 can show that a proposed modification has been dealt with in the current editing process, and that the segment need not be looked at again: but in our preferred embodiment it never disappears wholly without trace, since every version remains available (as a flat file, or by reconstruction, the difference being invisible to the user except in its impact on storage space), and its different elements can be re-invoked by the user whenever the version is in the active set S.

All the description above refers to the display of proposed changes. We now address the modifications made by the current user. Drawing 6 shows our preferred columnar arrangement when the user is replacing a part of the text that other versions have not modified. The baseline text 610 still flows visibly and continuously, but the new text appears as a column added from the left, with a corresponding handle bracket 605. In our preferred embodiment, the current user's new material also has a unique color code.

A single small change such as the substitution 606 is shown in line, as illustrated, with a handle 607 on the left to toggle it into and out of visibility. In our currently preferred embodiment the 'closed' state by default shows the baseline version, as this emphasizes the important point that the baseline version is never overwritten: the first modification that the current user makes creates a new current version, which is progressively modified and may at any time be saved as a distinct file. However, an embodiment may alternatively show the modified form in the 'closed' state, either by default or by the user's setting of a preference. (Optionally, the modified material may be displayed, stored or both as a change in the baseline file itself, rather than in a distinct current version, but this is not our preferred embodiment.)

Dynamically, as small changes occur close to each other, the modified text may pass the threshold of density of local difference. Upon this event, the view changes to a columnar display like 605 of the new material in the current version, with the old material flowing 610 around it. As with small changes, an embodiment may display the closed version of such a change by a full width display of either the baseline material or the current version material, according to default settings, implementation choices, or user setting of preference. As with the minimized columns 550, the display may include a minimized 'current version' column or 'baseline' column.

If the user makes changes to a segment 620 for which other versions have proposed changes, our preferred embodiment shows the changes (if they pass the threshold to require a column) in a column on the left, separated by the column showing baseline material. In our preferred embodiment the baseline material is shown in a consistent color and style, uninterrupted by changes of color, by markings such as the lines 630, or by any other graphical indications of separation. Where it is minimized, it should nevertheless be visibly continuous with other baseline material.

The user may adopt a proposed change by (according to the embodiment) clicking or double-clicking it, dragging it to the 'current version' position, cutting and pasting a part of it into the current version column, or by a multiplicity other such means, that will be evident to one skilled in the art.

The user's option to set or reset the choice of baseline file can be exercised at any time: in particular, the user can declare the current version as a new baseline. The old baseline may then either be cut from the list of currently open and displayed files, or function as simply another file whose differences from the current baseline are to displayed.

Reversal ('Undo') of the change represented by a single columnar segment can be accomplished by the standard adoption mechanisms described above, using a baseline or old-baseline column as source. Alternatively, if a segment of the current version is currently selected, by such means as clicking on a handle 605, by holding a mouse button pressed while moving the cursor between chosen start and end points, or by such other means as will evident to one skilled in the art, then an Undo key-press such as the widely-used Control-Z will reverse changes made in that segment only, with a 're-do' key-press such as Control-Y undoing the reversals. (This is unlike the typical Undo mechanism, which treats all change events as a single, unlocalized sequence: if the user made changes alternating between two widely separate paragraphs, such a system will jump between the paragraphs as it performs Undo on changes in reverse order. In our preferred embodiment, this occurs only if the user has selected handles on both paragraphs, or otherwise defined a region which includes both.) In the same context of the selection of some or all of the current version, a slider widget may be used to the same effect, with leftward motion giving the same result as a sequence of Control-Z presses, rightward motion equivalent to a sequence of Control-Ys. Adoption of the difference from a particular earlier state of the current version achieves 'global undo' for the entire subset of the current version currently selected.

Whenever the user chooses, and automatically upon exit from the program (without a "Do you want to save your changes?" dialog box, and preferably with an autosave function that leaves a suitable record even upon unplanned exit), the current version is saved as a new file, in such a way that it can be mailed, input as a member of the set S in a later use of the program, or otherwise used as a file in the ordinary way. Several such files may be saved in the course of a single session: optionally such a file may be stored in the form of a list of modifications of another version, provided only that the storage method permits recovery and use as though it were a separately stored file in an operating system folder.

Many small changes in the displays described, such as modifications of the default lateral order of columns, display of handle brackets 340 on the left, right or both of the text window, use of an iconic shape other than rectangular brackets, and so on, will be evident to those skilled in the art.

In the overall organization, Drawing 7 represents a personal computer or server, or combination thereof, 701. Within this configuration is a processing unit 710 (which may be the CPU of the user's system, or a processor forming part of the server), and a long-term computer memory 711. This long-term storage 711 may again be within the user's computer, or otherwise accessed by it, or within the server, or otherwise accessed by it. It contains a set of sequential files (such as text documents) 721. The processor 710 also contains shorter-term memory 730 such as dynamic RAM.

Drawing 8 illustrates a session implementing the method. At the start 801 of such a session, the system 701 presents via the user's display a list of the sequential files 721, or a subset thereof determined by parameters such as the user's access permission, a current project or folder to which the displayed files must belong. In particular, the list may take the form of icons on the user's desktop, or an opened folder, or a folder on the server opened via web access, or be defined and determined by other such means as will be evident to one skilled in the art. The user makes 802 a choice among these files, by such as means as 'drag and drop' selected files to an application or its window or to a web application operated by the server, by highlighting files and double-clicking them, by highlighting files and clicking on a menu action, or by other such means as will be evident to one skilled in the art. The chosen files are loaded 803 into the dynamic memory 730 on the processor 710.

One of these files is selected 805 as the baseline: in an embodiment this may be the file first in the choosing 802, the earliest-dated file among those selected, the most recent file associated with the current user as creator, or by other such criteria as will be evident to one skilled in the art.

The processing unit 710 then creates 810 a unified internal data representation of the set of files loaded in step 803, which describes common sections of content between the baseline and other individual files, and short or long sections where they differ. In our preferred implementation the unified internal data representation does not directly contain descriptors of differences between any pair of files does not include the current baseline file.

The system then creates a display incorporating the baseline file's content in full sequence, with fragmentary insertions from the other files where they differ from the baseline file's content, by placement or by material contained. In this process it 820 distinguishes low grade differences of content, which are to be represented within one self-contained line or in a move between two self-contained lines, and high grade differences of content which (for reasons of layout practicality, or for such other reasons as will be evident to one skilled in the art), and high grade differences of content, which are to be represented by parallel columns. These preparations occur within the server, if present, or within the user's computer, as convenient.

The system then presents 830 to the user the display so constructed, via a display on the user's local system. This may be achieved via a locally installed application, via a Rich Internet Application (RIA) functioning partly on the user's machine, via a window displayed within a web browser, or via such other means as will be evident to one skilled in the art. The display is a dynamic one, permitting 850 the user to create a new file by accepting one or more of the differences as changes, or to make other, independent changes in content, or both. Any such change defines a new sequential file, necessarily distinct from the baseline and treated as distinct from any one of the differing files (even if the user chose to overrule the baseline version in favour of all the differences shown in that differing file, and makes no other change). The resulting new sequential file can then be saved, edited, transmitted, etc., in the manner of any other sequential file.

An embodiment discloses a method and system for harmonization of variants of a document, comprising the steps of: a) assembling a set of sequential files, of which one is selected as the baseline; b) creating a unified data structure describing the baseline file and the differences from it of the other files in the said set; c) so displaying the said data structure that material in common between the files uses the full width of a display window, small isolated differences are shown in line, and larger or grouped differences are shown in separate columns; d) enabling the user to create a file incorporating elements of the different files, and to edit further changes into it.

An embodiment discloses a method where in step (d) the file created is a new current version, displayed and stored separately from the baseline version, and treated as a new member of the said set.

An embodiment discloses a method where in step (d) the file created is displayed by causing the appearance of the baseline version to change in situ.

An embodiment discloses a method where saving the current version creates a new file, separately retrievable from those saved previously.

An embodiment discloses a method where the file is saved using the separate file storage mechanism of an operating system.

An embodiment discloses a method where the file is saved as a set of differences from a reference file, and is retrievable via software operations that reconstruct it from the said differences and the said reference file.

An embodiment discloses a method where the baseline version is displayed uniformly through its wide and columnar parts.

An embodiment discloses a method where in-line markings or columns reflecting differences between the said baseline file and particular other members of the said set are color-coded according to each said other member or its author.

An embodiment discloses a method where the columns showing variants occurring in non-baseline files appear on one side of the column showing material from the baseline file, and a column showing material from the current version (if this is different from the baseline) appears on the other.

An embodiment discloses a method where the said data structure is based on a tree representation of the contents of each file, and of their differences.

An embodiment discloses a method where the said data structure is a sequence of words, format markers and tags to indicate the sources of particular segments.

An embodiment discloses a method where in every columnized section the baseline file has a column.

An embodiment discloses a method where if the other columns represent insertions, the column representing the baseline file is blank.

An embodiment discloses a method where the marked differences, whether shown in line or as columns, have icons by which they can be toggled in and out of visibility.

An embodiment discloses a method where the display alternative in which the said changes are invisible shows the contents of the baseline file.

An embodiment discloses a method where the display alternative in which the said changes are invisible shows the contents of the current file.

An embodiment discloses a method where the differences of another file from the baseline can be collectively toggled in and out of visibility.

An embodiment discloses a method where a columnar segment may be minimized.

An embodiment discloses a method where a columnar segment may be iconized as already considered.

An embodiment discloses a method where clicking on a columnar segment from a version different from the current version causes it to replace the contents of the corresponding segment of the current version.

An embodiment discloses a method where clicking on in-line text drawn from a version different from the current version causes it to replace the contents of the corresponding segment of the current version.

An embodiment discloses a method where selecting a subset of a column drawn from a version different from the current version, and clicking on the said subset, causes it to replace the corresponding contents of a corresponding segment of the current version.

An embodiment discloses a method where the said version different from the current version is an earlier state of the current version, resulting in a collective undo of changes within the selected subset.

An embodiment discloses a method where selecting a columnar section of the display, or the current version's column therein, limits the effect of sequential undo and re-do to material within the selected section.

An embodiment discloses a method where sequential undo and re-do are caused by user key-presses.

An embodiment discloses a method where sequential undo and re-do are caused by user dragging of a slider.

An embodiment discloses a method where selecting by any means a subset of the displayed material limits the effect of sequential undo and re-do to material within the selected subset.

An embodiment discloses a method where sequential undo and re-do are caused by user key-presses.

An embodiment discloses a method where sequential undo and re-do are caused by user dragging of a slider.

An embodiment discloses a method where a version of the current file is saved automatically upon exit from the program.

An embodiment discloses a method where an autosave process continually updates such a version, which becomes the automatically saved version upon either deliberate or accidental exit from the program.

An embodiment discloses a method where the baseline version is chosen as that with least total difference from the others.

An embodiment discloses a method where the baseline version is chosen as the oldest file.

An embodiment discloses a method where the baseline version is chosen by the user.

An embodiment discloses a method where the baseline version is one from which tracking or comparison has enabled the system to determine that all others in the said set are ultimately derived from it.

An embodiment discloses a method where the lateral sequence of columns may be modified by the user.

An embodiment discloses a method where the said modification is by a drag and drop process.

An embodiment discloses a method where the said modification is by clicking lateral motion icons corresponding to the individual columns.

An embodiment discloses a method where the effect of such modification is local to a particular row of columns.

An embodiment discloses a method where the effect of such modification is global to all rows of columns.

Furthermore, embodiments disclose a method in an electronic device performed by a control unit in the electronic device for harmonization of variants of a document, comprising the steps of: assembling a set of sequential files of the document, selecting one file as a baseline file of the document; creating a unified data structure describing the baseline file and at least one difference from the baseline file of at least one sequential file in the set; determining the grade of the at least one difference, displaying common data between the baseline file and the at least one sequential file by using the full width of a display window, and the at least one difference based on the determined grade, wherein low graded differences are shown in line in a unified display of the data of the baseline file, and higher graded differences are shown in separate columns; and enabling a user to create a file, separately retrievable from the set of sequential files, incorporating elements of the different files of the set of sequential files, and to edit further changes into the created file.

Embodiments disclose methods, where the step of determining grade of the difference may comprises determining that a word change, a format, a letter change or the like is a low graded difference and a changed sentence, deleted/inserted paragraph or the like is a high graded difference, and the step of determining the grade of the difference comprises determining whether the difference and baseline text can together be inserted within a single unbroken line, in an active typographic context, in which case it is a low grade difference, or otherwise, in which case it is a high grade difference.

In order to perform the embodiments of the methods a computer, such as a server, is arranged to perform the steps of the methods.

Furthermore, a computer program product is provided including a computer usable medium having computer program logic stored therein to enable a control unit of an electronic device to perform the steps of: assembling a set of sequential files of the document, selecting one file as a baseline file of the document; creating a unified data structure describing the baseline file and at least one difference from the baseline file of at least one sequential file in the set; determining the grade of the at least one difference, displaying common data between the baseline file and the at least one sequential file by using the full width of a display window, and the at least one difference based on the determined grade, wherein low graded differences are shown in line in a unified display of the data of the baseline file, and higher graded differences are shown in separate columns; and enabling a user to create a file, separately retrievable from the set of sequential files, incorporating elements of the different files of the set of sequential files, and to edit further changes into the created file.

The computer program product may also be adapted to perform the steps of the different embodiments of the method.

In the drawings and specification, there have been disclosed exemplary embodiments. However, many variations and modifications can be made to these embodiments.

Accordingly, although specific terms are employed, they are used in a generic and descriptive sense only and not for purposes of limitation, of the following claims.

What is claimed is:

1. A method in an electronic device performed by a control unit in the electronic device for harmonization of variants of a sequential file, comprising the following steps performed by a processor:
  assembling a set of sequential files from among available variants;
  selecting one file as a baseline file;
  creating a unified data structure describing the baseline file and at least one difference from the baseline file of at least one sequential file in the set;
  determining a grade of the at least one difference;
  displaying common data between the baseline file and the at least one sequential file by using a full width of a display window, and the at least one difference based on the determined grade, wherein low graded differences are shown in line in a unified display of data drawn from the unified data structure, and higher graded differences are shown in separate columns; and
  enabling a user to create a file, separately retrievable from the set of sequential files, incorporating elements of the different files of the set of sequential files, and to edit further changes into the created file.

2. A method according to claim 1, where the created file is a new current version, displayed and stored separately from the baseline version, and treated as a new member of the set.

3. A method according to claim 1, where the created file is displayed by causing the appearance of the baseline version to change in situ.

4. A method according to claim 1, where the created file is saved using a separate file storage mechanism of an operating system, or as a set of differences from a reference file, and is retrievable via software operations that reconstruct it from the differences and the reference file.

5. A method according to claim 1, where in-line markings or columns reflecting differences between the baseline file and other members of the set are color-coded according to each other member or its author.

6. A method according to claim 1, where the data structure is based on a tree representation of the contents of each file, and of the differences.

7. A method according to claim 1, where the data structure is a sequence of words, format markers and tags to indicate the sources of particular segments.

8. A method according to claim 1, where in every columnized section the baseline file has a column, which is blank if the other column or columns represent insertions.

9. A method according to claim 1, where the marked differences, whether shown in line or as columns, have icons by which they can be individually or collectively toggled in and out of visibility.

10. A method according to claim 1, where the display alternative in which the changes are invisible shows the contents of the baseline file, or of the current version.

11. A method according to claim 1, where a columnar segment may be minimized or iconized.

12. A method according to claim 1, where clicking on a columnar segment, selected subset thereof, or in-line text from a version different from the created file causes it to replace the contents of the corresponding segment of the current version.

13. A method according to claim 1, where a version of the created file is saved automatically upon exit from the program, or an auto save process continually updates such a version, which becomes the automatically saved version upon either deliberate or accidental exit from the program.

14. A method according to claim 1, where the baseline version is chosen as that with least total difference from the others.

15. A method according to claim 1, where the baseline version is one from which tracking or comparison has enabled the system to determine that all others in the set are ultimately derived from it.

16. A method according to claim 1, where the lateral sequence of columns may be modified by the user.

17. A method according to claim 1, wherein the step of determining the grade of the difference comprises determining whether the difference and baseline text can together be inserted within a single unbroken line, in an active typographic context, in which case it is a low grade difference, or otherwise, in which case it is a high grade difference.

18. A computer comprising:
  a control unit connected to a memory and arranged to perform the following in order to harmonize variants of a sequential file:
  assemble a set of sequential files from among available variants;
  select one file as a baseline file;
  create a unified data structure describing the baseline file and at least one difference from the baseline file of at least one sequential file in the set;
  determine a grade of the at least one difference;
  display common data between the baseline file and the at least one sequential file by using a full width of a display window, and the at least one difference based on the determined grade, wherein low graded differences are shown in line in a unified display of data drawn from the unified data structure, and higher graded differences are shown in separate columns; and
  enable a user to create a file, separately retrievable from the set of sequential files, incorporating elements of the different files of the set of sequential files, and to edit further changes into the created file.

19. A computer program product including a computer usable storage medium having computer program logic stored therein which when implemented by a control unit of an electronic device enable the control unit to perform the steps of:
  assembling a set of sequential files from among available variants;
  selecting one file as a baseline file;
  creating a unified data structure describing the baseline file and at least one difference from the baseline file of at least one sequential file in the set;
  determining a grade of the at least one difference;
  displaying common data between the baseline file and the at least one sequential file by using a full width of a display window, and the at least one difference based on the determined grade, wherein low graded differences are shown in line in a unified display of data drawn from the unified data structure, and higher graded differences are shown in separate columns; and
  enabling a user to create a file, separately retrievable from the set of sequential files, incorporating elements of the different files of the set of sequential files, and to edit further changes into the created file.

* * * * *